(12) United States Patent
Kinoshita

(10) Patent No.: US 11,551,539 B2
(45) Date of Patent: Jan. 10, 2023

(54) HYGIENE MANAGEMENT DEVICE AND HYGIENE MANAGEMENT METHOD

(71) Applicant: TOSHIBA TEC KABUSHIKI KAISHA, Tokyo (JP)

(72) Inventor: Yasuhiro Kinoshita, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 17/208,820

(22) Filed: Mar. 22, 2021

(65) Prior Publication Data

US 2021/0375118 A1 Dec. 2, 2021

(30) Foreign Application Priority Data

Jun. 1, 2020 (JP) ............................. JP2020-095596

(51) Int. Cl.
| | |
|---|---|
| G08B 21/24 | (2006.01) |
| G07C 9/30 | (2020.01) |
| G09B 19/00 | (2006.01) |
| G06V 40/20 | (2022.01) |
| G06V 40/10 | (2022.01) |

(52) U.S. Cl.
CPC ......... G08B 21/245 (2013.01); G06V 40/107 (2022.01); G06V 40/28 (2022.01); G07C 9/30 (2020.01); G09B 19/0076 (2013.01)

(58) Field of Classification Search
CPC ........ G08B 21/245; G07C 9/30; G06V 40/28; G06V 40/107; G09B 19/076
See application file for complete search history.

(56) References Cited

U.S. PATENT DOCUMENTS

| | | | |
|---|---|---|---|
| 2010/0134296 A1* | 6/2010 | Hwang ................ | G08B 21/245 340/573.1 |
| 2012/0140054 A1* | 6/2012 | Chen ........................ | H04N 7/18 348/E7.085 |
| 2018/0047277 A1* | 2/2018 | Thyroff .................. | G08B 21/24 |
| 2018/0151054 A1* | 5/2018 | Pi .......................... | G08B 21/245 |

FOREIGN PATENT DOCUMENTS

JP 2011099968 A 5/2011

* cited by examiner

Primary Examiner — Kam Wan Ma
(74) Attorney, Agent, or Firm — Kim & Stewart LLP

(57) ABSTRACT

According to one or more embodiment, a hygiene management device includes a processor. The processor determines based on image recognition whether a plurality of predetermined procedures of a hand-washing action have been completed by a subject. The processor executes different types of processing, such as, for example, opening or closing a passage, depending on completion or incompletion of each of the plurality of predetermined procedures.

16 Claims, 11 Drawing Sheets

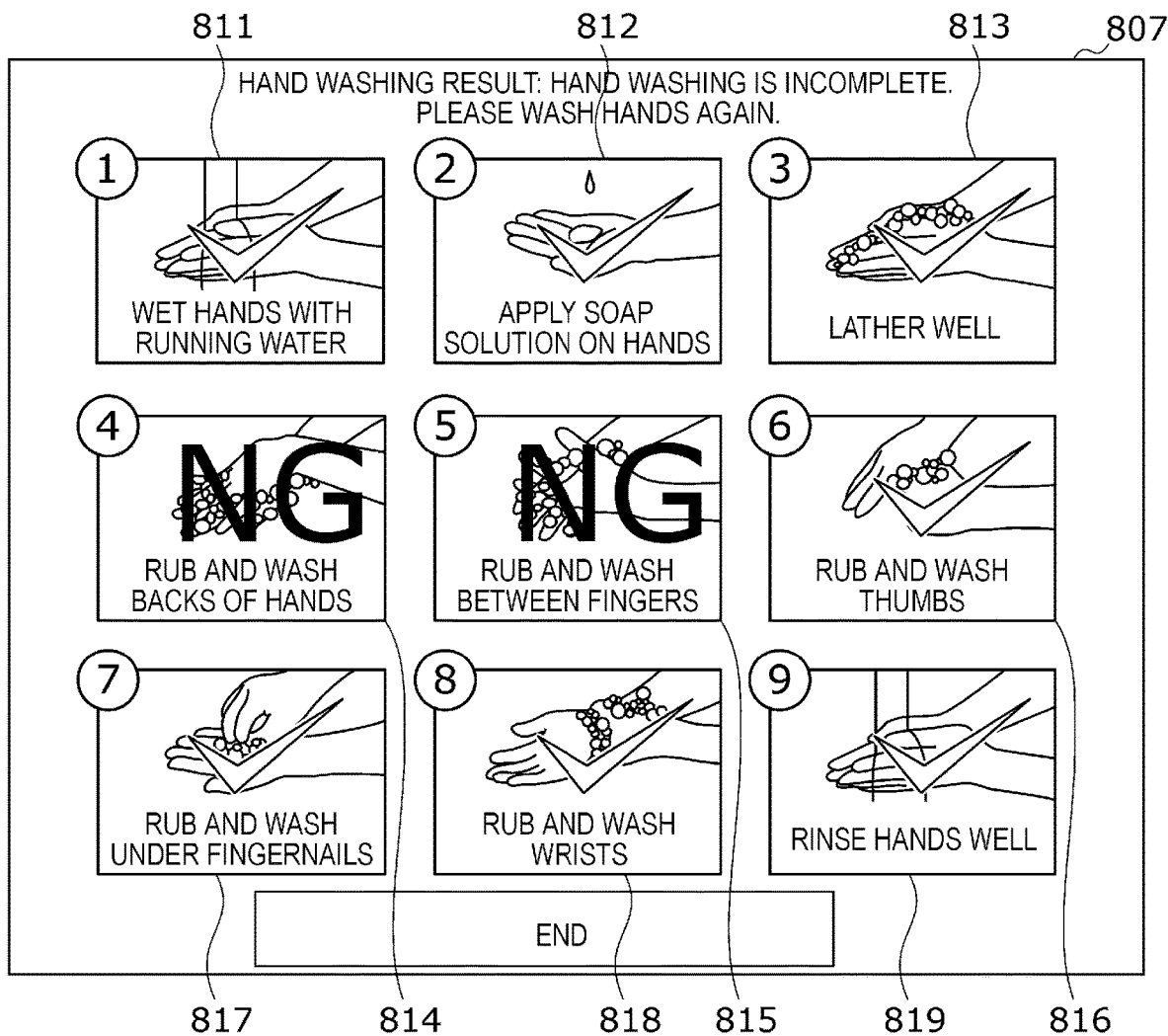

HYGIENE MANAGEMENT DEVICE AND HYGIENE MANAGEMENT METHOD

CROSS-REFERENCE TO RELATED APPLICATION

This application is based upon and claims the benefit of priority from Japanese Patent Application No. 2020-095596, filed on Jun. 1, 2020 the entire contents of which are incorporated herein by reference.

FIELD

Embodiments described herein relate generally relate to a hygiene management device and a hygiene management method.

BACKGROUND

In a food factory and the like, a hygiene-controlled area or a clean area is separated from a non-clean area, and when entering the clean area from the non-clean area, it may be required to follow a hygiene control procedure including handwashing. Similarly, in a hospital, a shop, a restaurant, a nursing care site, an educational site, and the like, it is often required to wash hands in a requested or suggested manner for preventing infectious diseases and maintaining hygiene. In such a place where hygiene control is required, an employee, a worker, and other persons who enter and exit the place may be required to completely carry out a predetermined hand-washing routine.

BRIEF DESCRIPTION OF THE DRAWINGS

FIG. 11 depicts another result screen according to an embodiment.

DETAILED DESCRIPTION

According to one or more embodiment, a hygiene management device includes a processor. The processor determines based on image recognition whether a plurality of predetermined procedures of a hand-washing action have been completed by a subject. The processor executes different types of processing depending on completion or incompletion of each of the plurality of predetermined procedures.

Some example embodiments will be described with reference to the accompanying drawings. In each drawing used for describing the embodiments, the scale of each part may be changed as appropriate.

Figure 1:
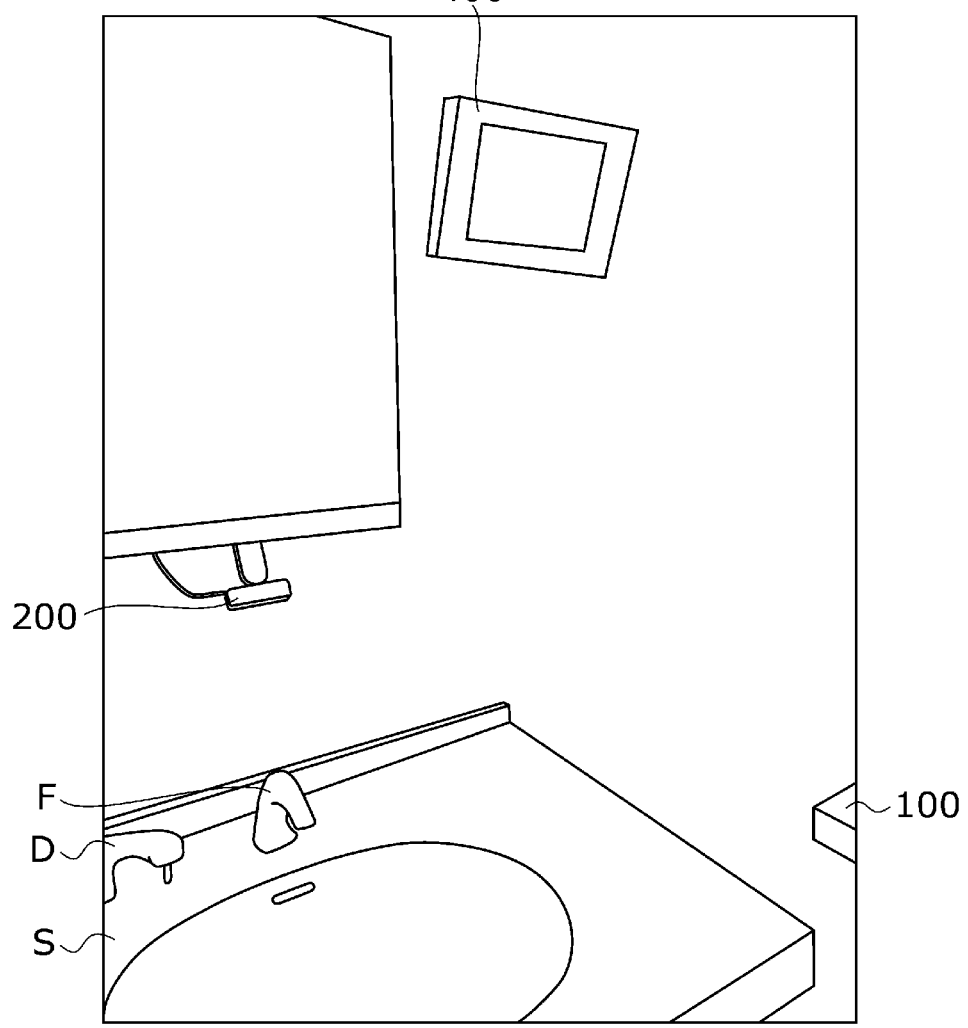
FIG. 1 depicts an example configuration of a hygiene management system according to an embodiment.
Figure 2:
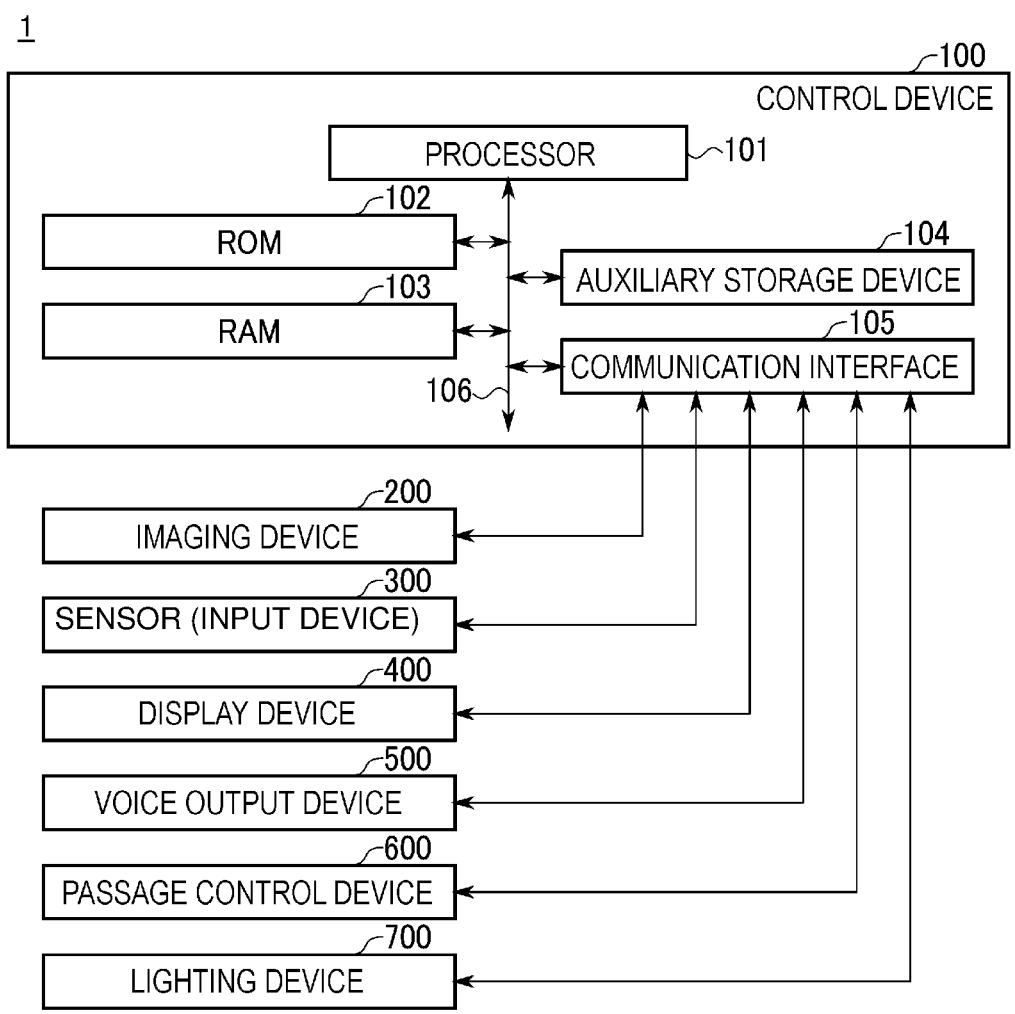
FIG. 2 depicts an example configuration of a hygiene management system according to an embodiment.

FIG. 1 and FIG. 2 each depict an example configuration of a hygiene management system 1 according to an embodiment. As shown in FIG. 1, the hygiene management system 1 may be installed near a washbasin S or another place for washing hands. The hygiene management system 1 recognizes a hand-washing action of a subject, such as a person, by image recognition of the hand-washing action. As shown in FIG. 2, the hygiene management system 1 includes, for example, a control device 100, an imaging device 200, an input device 300, a display device 400, a voice output device 500, a passage control device 600, and a lighting device 700.

The control device 100 controls the hygiene management system 1. The control device 100 is, for example, a computer such as a personal computer (PC) or a server. The control device 100 includes, for example, a processor 101, a read-only memory (ROM) 102, a random-access memory (RAM) 103, an auxiliary storage device 104, and a communication interface 105. A bus 106 and the like connect these units. The control device 100 is an example of a hygiene management device.

The processor 101 corresponds to a central part of a computer that performs processing such as arithmetic operation and control necessary for the operation of the control device 100. The processor 101 controls each unit to realize various functions of the control device 100 based on one or more programs such as firmware, system software, operating system, and application software stored in the ROM 102 or the auxiliary storage device 104. The processor 101 executes processing based on the program(s). Some or all of the functions provided by one or more programs may be incorporated into a circuit of the processor 101. The processor 101 is, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD) or a field-programmable gate array (FPGA). Alternatively, the processor 101 is a combination of a plurality of these components.

The ROM 102 is a non-volatile memory used exclusively for reading data. The ROM 102 stores, for example, firmware as the program. The ROM 102 also stores data used by the processor 101 in performing various types of processing.

The RAM 103 is a memory used for reading and writing data. The RAM 103 is used as a work area for storing data that is temporarily used by the processor 101 in performing various processing. The RAM 103 is typically a volatile memory.

The auxiliary storage device 104 is, for example, an electric erasable programmable read-only memory (EEPROM), a hard disk drive (HDD), or a flash memory. The auxiliary storage device 104 stores, for example, system software and application software as the programs. The auxiliary storage device 104 also stores data used by the processor 101 in performing various processing, data generated by processing in the processor 101, various setting values, and the like.

The communication interface 105 is an interface for the control device 100 to communicate with the imaging device 200, the input device 300, the display device 400, the voice output device 500, the passage control device 600, the lighting device 700, and the like. Each of the imaging device 200, the input device 300, the display device 400, the voice output device 500, the passage control device 600, and the lighting device 700 may be a device external to the control device 100 or a device built into the control device 100. The communication interface 105 may be an interface for communicating via the Internet or a local area network (LAN).

The imaging device 200 is a camera or the like that captures an image. The imaging device 200 is installed so that hands of a subject who is washing his or her hands on the washbasin S can be seen in the captured images. The imaging device 200 outputs the captured image data. The image data is input to the control device 100 via the communication interface 105. A moving image (video) is one type of image that can be captured.

The bus 106 includes a control bus, an address bus, a data bus, and the like. The bus 106 transmits a signal transmitted and received by each unit of the control device 100.

The input device 300 receives an operation input by a subject (e.g., a handwasher), an input based on an action of the subject, a voice input, or the like. The input device 300 is, for example, a keyboard, a keypad, a touchpad, a mouse, a button, and/or a microphone. The input device 300 may be various sensors in combination or the like. The input device 300 may be a device such as a camera or a sensor used for biometric authentication. In one instance, a camera for biometric authentication may be different from a camera of the imaging device 200. In another instance, the imaging device 200 may be used also for biometric authentication. The hygiene management system 1 may include a plurality of types of input devices 300.

The display device 400 displays a screen for notifying the subject of various types of information. The display device 400 is, for example, a display such as a liquid crystal display or an organic electro-luminescence (EL) display. A touch panel can be used as the input device 300 and the display device 400. A display panel included in the touch panel can be used as the display device 400, and a pointing device operated by a touch input and included in the touch panel can be used as the input device 300. The display device 400 is an example of a notification unit.

The voice output device 500 is a speaker that outputs a voice or other sounds for notifying the subject of various types of information.

The passage control device 600 controls the opening and closing and/or the unlocking and locking of a passage, such as a gate or a door, through which the subject passes after washing his or her hands. With the passage control device 600, the control device 100 controls whether the subject can pass through or enter the passage depending on completion or incompletion of the predetermined hand-washing action. For instance, the passage control device 600 keeps the passage impassable (locked/closed) until the subject completes all predetermined procedures or steps of the hand-washing action. Once the subject has completed all predetermined procedures, the passage control device 600 then opens or unlocks the passage to make it passable for the subject.

The lighting device 700 illuminates the area around the subject's hands and controls the illumination. The lighting device 700 brightens the subject's hands with the illumination, thereby preventing deterioration of image recognition accuracy due to insufficient brightness or the like. The lighting device 700 uses illumination to make the optical imaging conditions of the imaging device 200 more constant (stable), thereby improving the accuracy of image recognition.

Figure 3:
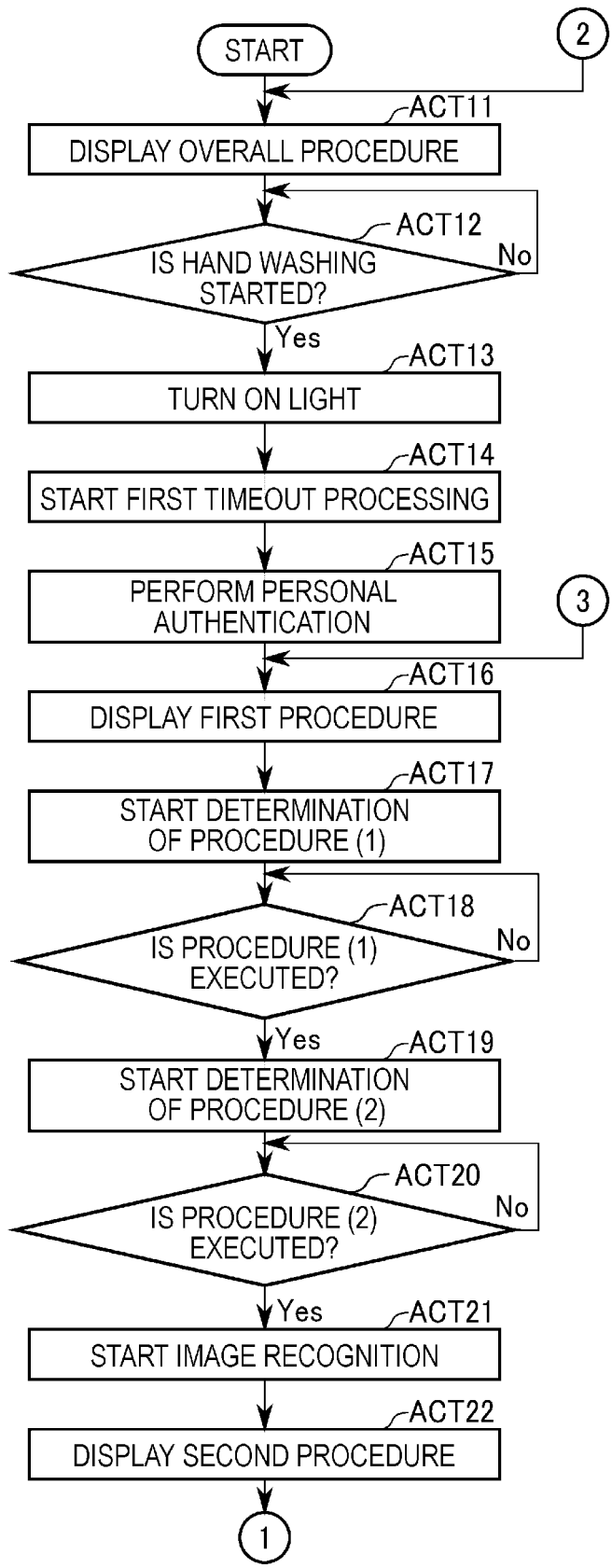
FIG. 3 is a flowchart of example processing by a processor according to an embodiment.
Figure 4:
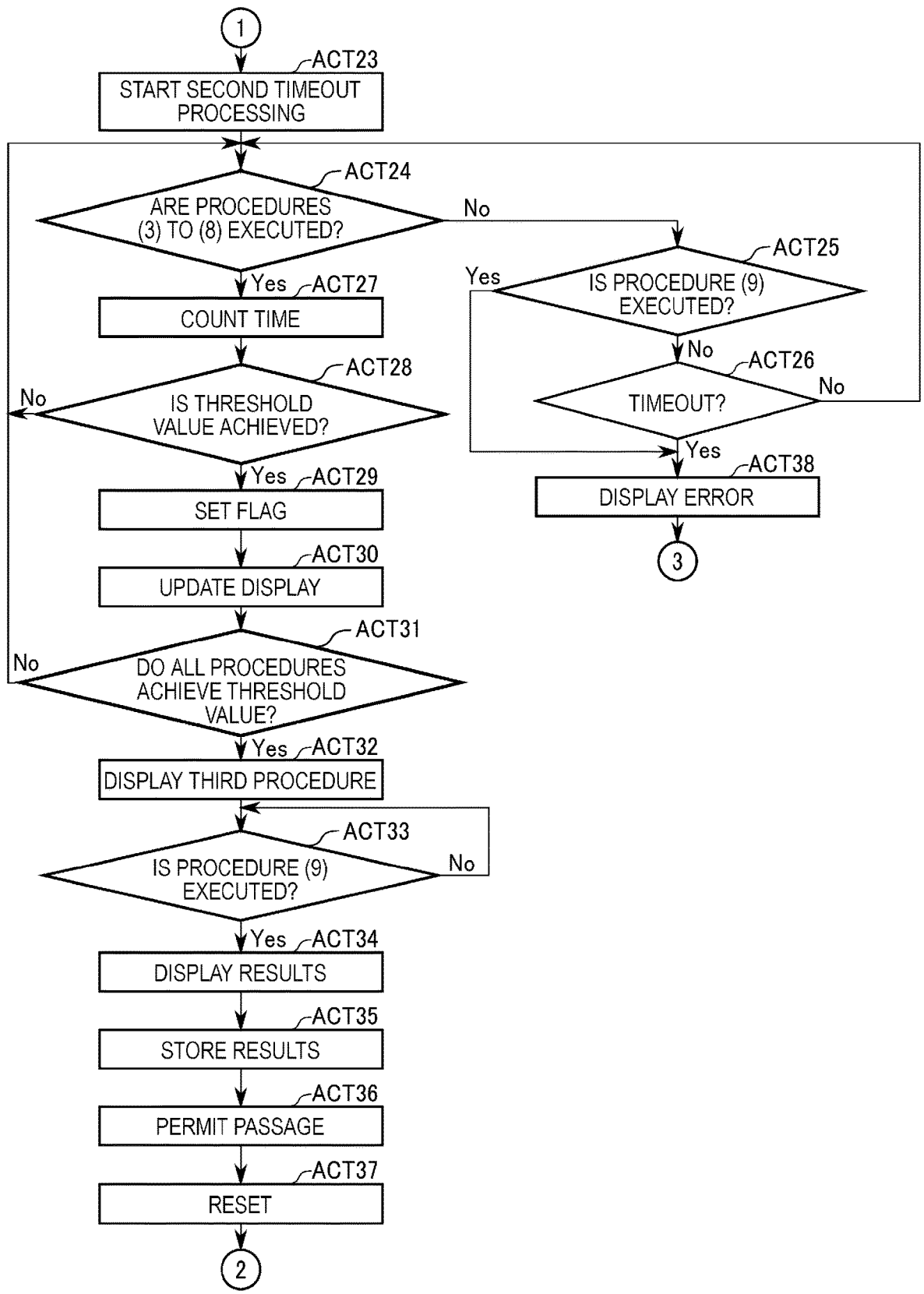
FIG. 4 is a flowchart of example processing by a processor according to an embodiment.

FIGS. 3 and 4 are flowcharts of example processing by the processor 101 of the control device 100. The processor 101 executes the processing of FIGS. 3 and 4 based on the program or programs stored in the ROM 102 or the auxiliary storage device 104, for example. In another embodiment, various types of processing capable of obtaining the same or a similar result can be used and executed by the processor 101 in an appropriate manner.

In ACT 11 of FIG. 3, the processor 101 generates an image corresponding to an overall procedure screen 801 (see FIG. 5) illustrating an overall procedure of the hand-washing action. Then, the processor 101 instructs the display device 400 to display the generated image. Upon receiving the instruction, the display device 400 displays the overall procedure screen 801.

Figure 5:
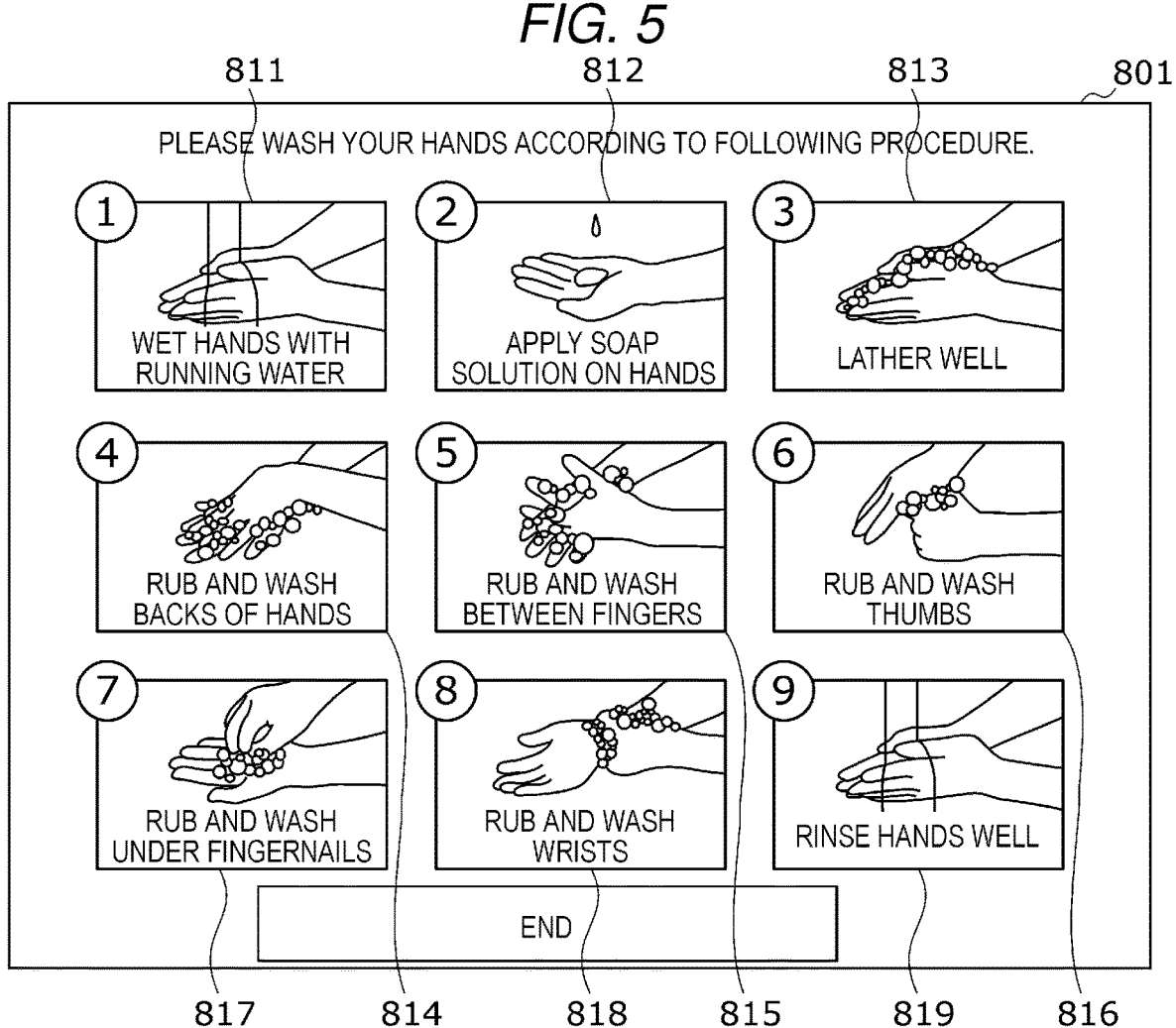
FIG. 5 depicts an overall procedure screen according to an embodiment.

FIG. 5 depicts an example of the overall procedure screen 801. The overall procedure screen 801 includes, for example, nine areas 811 to 819, which correspond to procedures (1) to (9) included in the hand-washing action, respectively. Each of the areas 811 to 819 displays a description and an image of each procedure.

As an example, the hand-washing action includes the following procedures (1) to (9):

(1) Wet hands.
(2) Apply soap.
(3) Lather soap.
(4) Rub and wash the backs of hands.
(5) Rub and wash between fingers.
(6) Rub and wash thumbs.
(7) Rub and wash under fingernails.
(8) Rub and wash wrist.
(9) Rinse hands with running water.

In ACT 12, the processor 101 determines whether the subject has started hand-washing. In one instance, the processor 101 determines that the subject has started hand-washing in response to a predetermined operation performed by the subject on the input device 300. The operation is, for example, an input operation made using a button, a mouse, a keyboard, a touch panel, or the like. In another instance, the processor 101 determines that the subject has started hand-washing by image recognition using an image of the subject captured by the imaging device 200. For example, the processor 101 determines whether the hand is in the captured image based on a change in contrast or the like and that the subject has started hand-washing if the hand is in the image. In still another instance, the processor 101 determines that the subject has started hand-washing in response to detection of the subject or the subject's hand by an optical sensor such as a human sensor using infrared rays or the like or an obstacle detection sensor using a laser or the like. In a further instance, the processor 101 determines that the subject has started hand-washing in response to detection of approach of the subject or the subject's hands by a proximity sensor using non-contact method such as radio waves or magnetism. In another instance, the processor 101 determines that the subject has started hand-washing by detecting a start of water flow from a faucet F by a flow rate sensor installed in the faucet F or the like. If the processor 101 determines that the subject has not started hand-washing (No in ACT 12), the processor 101 repeats the determination processing of ACT 12. If the processor 101 determines that the subject has started hand-washing (Yes in ACT 12), the processor 101 proceeds to the next processing (ACT 13).

In ACT 13, the processor 101 controls the lighting device 700 to turn on the light. The processor 101 may control the lighting device 700 to increase the brightness of the light.

In ACT 14, the processor 101 starts first timeout processing. The first timeout processing is for performing exception processing when the predetermined procedures of the hand-washing action are not finished even if a predetermined time period has elapsed from the start of a timer. For example, the processor 101 performs the exception processing when the processing of ACT 34 (see FIG. 4) is not performed even if a predetermined time period has elapsed from the start of the processing of ACT 14. In another instance, the processor 101 performs the exception processing when the processing of ACT 34 is not performed even if a predetermined time period has elapsed from the start of the processing of ACT 21 (see FIG. 3). In still another instance, the processor 101 may perform the exception processing when the processing of ACT 34 is not performed even if a predetermined time period has elapsed from the start of other processing. The exception processing is, for example, processing of displaying an image indicating an error on the display device 400, and stopping the on-going processing and returning to the processing of ACT 11. The processor 101 executes the first timeout processing, for example, in a thread different from the processing shown in FIGS. 3 and 4.

In ACT 15, the processor 101 performs personal authentication to obtain a personal identifier (ID) of the subject. The personal ID is identification information uniquely given to each subject. The processor 101 performs the personal authentication by reading information recorded on an IC card, such as an employee card or an electronic device posses sed by the subject, using a card reader, for example. The card reader communicates with, for example, a magnetic card (or a magnetic stripe card), a contact type IC card, or a non-contact type IC card. The card reader communicates with a non-contact type IC chip mounted on an electronic device (for example, a mobile phone, a smartphone, a tablet PC, and the like). Alternatively, the processor 101 may perform the personal authentication by performing biometric authentication such as face authentication, fingerprint authentication, iris authentication, or gait authentication on the subject. The processing of ACT 15 may be performed before the processing of ACT 12. The processor 101 may determine that the subject has started hand-washing when the personal authentication has been performed.

Accordingly, the processor 101 functions as an identification unit that obtains the identification information for identifying the subject by performing the processing of ACT 15.

In ACT 16, the processor 101 generates an image corresponding to a first procedure screen 802 (see FIG. 6) indicating the procedures belonging to a first block in the hand-washing action. The procedures included in the hand-washing action can be divided into a plurality of blocks. In the present embodiment, the procedures are divided into three blocks. The procedures belonging to the first block are, for example, procedures (1) and (2). Then, the processor 101 instructs the display device 400 to display the generated image. Upon receiving the display instruction, the display device 400 displays the first procedure screen 802.

Figure 6:
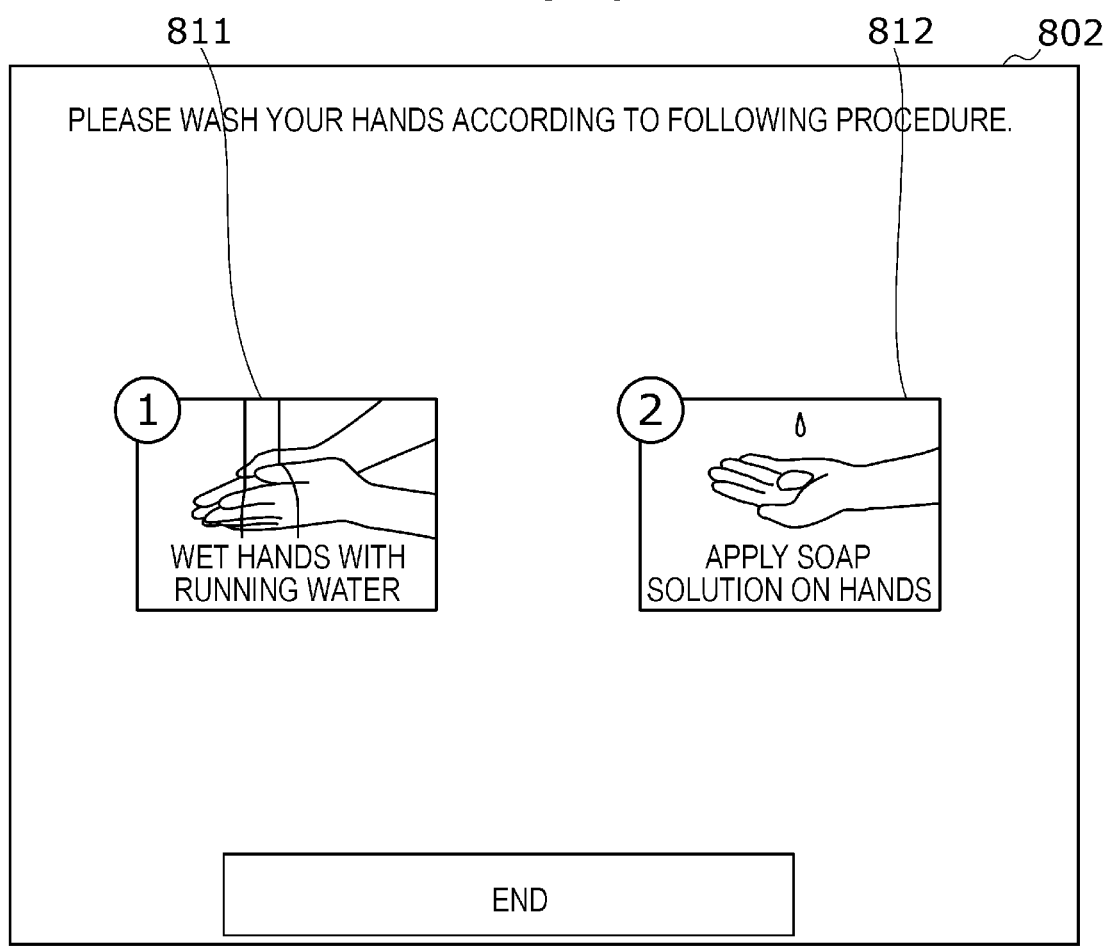
FIG. 6 depicts a first procedure screen according to an embodiment.

FIG. 6 depicts an example of the first procedure screen 802. The first procedure screen 802 includes an area 811 and an area 812. The areas 811 and 812 correspond to the procedures (1) and (2), respectively.

In ACT 17, the processor 101 starts the processing of determining whether the subject has executed the procedure (1), that is, whether the subject has executed an action of wetting his or her hands with running water. The processor 101 determines that the subject has executed the procedure (1) by using a sensor or the like. For example, the processor 101 determines that the subject executed the procedure (1) when an amount of water flowing out from the faucet F exceeds a predetermined amount by using a flow sensor or the like installed in the faucet F or the like. Alternatively, the processor 101 determines that the subject executed the procedure (1) when the time after the water starts to flow out becomes equal to or longer than a predetermined time period. In another instance, the processor 101 may determine by image recognition that the subject has executed the procedure (1). In still another instance, the processor 101 may determine that the subject executed the procedure (1) when a certain period of time elapses from the start of the processing of ACT 17.

In ACT 18, the processor 101 waits for the subject to execute the procedure (1). If the processor 101 determines the execution of the procedure (1) (Yes in ACT 18), the processor 101 proceeds to ACT 19.

In ACT 19, the processor 101 starts the processing of determining whether the subject has executed the procedure (2), that is, whether the subject has executed an action of applying soap on hands. The processor 101 determines that the subject has executed the procedure (2) by using a sensor or the like. For example, when a sensor installed in a hand soap dispenser D or the like detects that soap has come out of the hand soap dispenser D, the processor 101 determines that the subject has executed the procedure (2). Alternatively, the processor 101 may determine by image recognition that the subject has executed the procedure (2). In another instance, the processor 101 may determine that the subject has executed the procedure (2) after a certain period of time elapses from the start of the processing of ACT 17.

In ACT 20, the processor 101 waits for the subject to execute the procedure (2). If the processor 101 determines the execution of the procedure (2) (Yes in ACT 20), the processor 101 proceeds to ACT 21.

In ACT 21, the processor 101 starts image recognition using image data output from the imaging device 200. By this image recognition, the processor 101 recognizes a hand action of the subject. The processor 101 performs, for example, action recognition using a still image for each of a plurality of frames of a moving image captured by the imaging device 200. The action recognition may be based on, for example, feature data or values of the captured image. Then, the processor 101 adopts a mode, that is a value that occurs most often, of action recognition results for the plurality of frames as a correct action recognition result. For example, if the action recognition result of three frames out of five frames is the procedure (3) and the action recognition result of two frames is the procedure (5), the processor 101 adopts the procedure (3), which is the mode (the value that occurs most often), as the correct action recognition result. Alternatively, the processor 101 may utilize other action recognition methods or techniques in an appropriate manner so long as the hand action can be properly recognized.

In ACT 22, the processor 101 generates an image corresponding to a second procedure screen 803 (see FIG. 7) indicating the procedures belonging to a second block in the hand-washing action. The procedures belonging to the second block are, for example, the procedures (3) to (8). Then, the processor 101 instructs the display device 400 to display the generated image. Upon receiving the display instruction, the display device 400 displays the second procedure screen 803. The processor 101 proceeds to ACT 23 of FIG. 4 after completing the processing in ACT 22.

Figure 7:
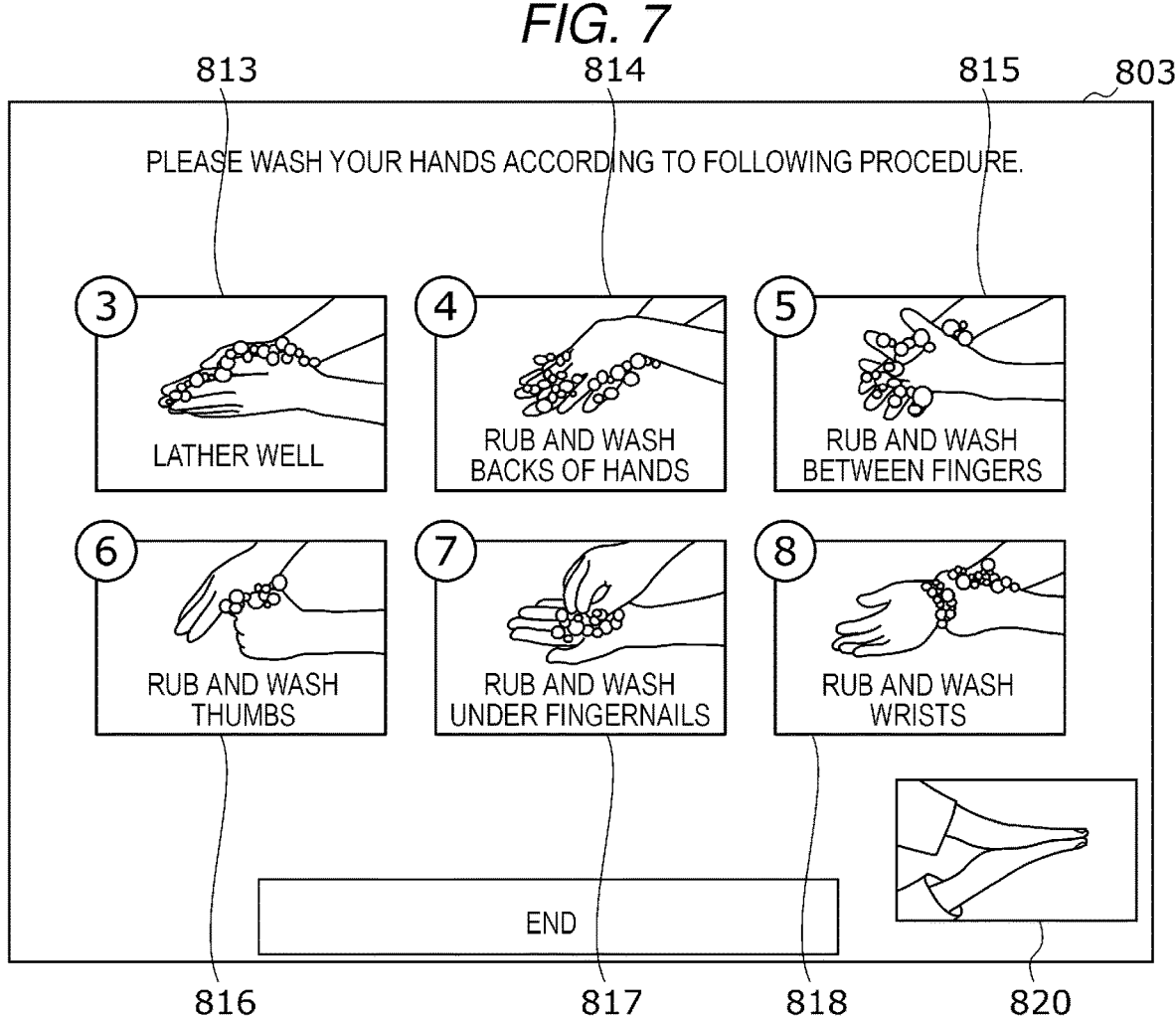
FIG. 7 depicts a second procedure screen according to an embodiment.

FIG. 7 depicts an example of the second procedure screen 803. The second procedure screen 803 includes areas 813 to 818 and an area 820. The areas 813 to 818 correspond to the procedures (3) to (8), respectively. In the area 820, the image captured by the imaging device 200 is displayed.

In ACT 23 of FIG. 4, the processor 101 make a timer start counting for second timeout processing. The second timeout processing is for performing exception processing when the processor 101 determines that the subject has not completed all of the procedures (3) to (8) within a predetermined time period.

In ACT 24, the processor 101 determines whether the subject has completed or executed at least one of the procedures (3) to (8) based on the action recognition result. When the processor 101 determines that the subject has not executed any one of the procedures (3) to (8) (No in ACT 24), the processor 101 proceeds to ACT 25.

In ACT 25, the processor 101 determines whether the subject has executed the procedure (9). The processor 101 performs this determination based on the action recognition result, for example. Alternatively, the processor 101 may perform the determination of execution of the procedure (9) using, for example, a sensor. When the processor determines that the subject has not executed the procedure (9) (No in ACT 25), the processor 101 proceeds to ACT 26.

In ACT 26, the processor 101 determines whether timeout has occurred by the second timeout processing. For example, the processor 101 determines that timeout has occurred when the time counted by the timer T is equal to or longer than a predetermined time period. If the processor determines that the timeout has not occurred (No in ACT 26), the processor 101 returns to ACT 24 and returns to awaiting state where ACT 24 to ACT 26 are repeated until the processor 101 determines that the subject has executed or completed at least one of the procedures (3) to (9) or until the timeout by the second timeout processing occurs.

If the processor 101 determines that the subject has executed at least one of the procedures (3) to (8) during the waiting state (YES in ACT 24), the processor 101 proceeds to ACT 27.

Accordingly, the processor 101 functions as a recognition unit that uses image recognition to recognize whether the subject has executed the constituent actions of the predetermined procedures of the hand-washing action.

In ACT 27, the processor 101 performs processing of counting execution time of the procedures (3) to (8) by the subject. The processor 101 counts the execution time of each of the procedures (3) to (8). For example, if the processor 101 determines by the action recognition that the subject executed the procedure (3) for n seconds, the processor 101 adds n seconds to the count of the execution time of the procedure (3).

In ACT 28, the processor 101 determines whether the count of the execution time becomes equal to or greater than a predetermined threshold value for each of the procedures. The control device 100 stores the threshold values for the respective procedures (3) to (8) in the auxiliary storage device 104 or the like. The processor 101 determines that the subject has completed the procedure if the execution time of that procedure is equal to or greater than the corresponding threshold value. If the processor 101 determines that the count of the execution time is not equal to or greater than the threshold value (No in ACT 28), the processor 101 returns to ACT 24. If the processor determines that the count of the execution time is equal to or greater than the threshold value (Yes in ACT 28), the processor 101 proceeds to ACT 29.

In ACT 29, the processor 101 sets a flag corresponding to the procedure for which the execution time is equal to or greater than the threshold value. The control device 100 stores the flag corresponding to each procedure. Each flag indicates that the corresponding procedure is now complete.

In ACT 30, the processor 101 updates the second procedure screen 803 displayed on the display device 400.

Figure 8:
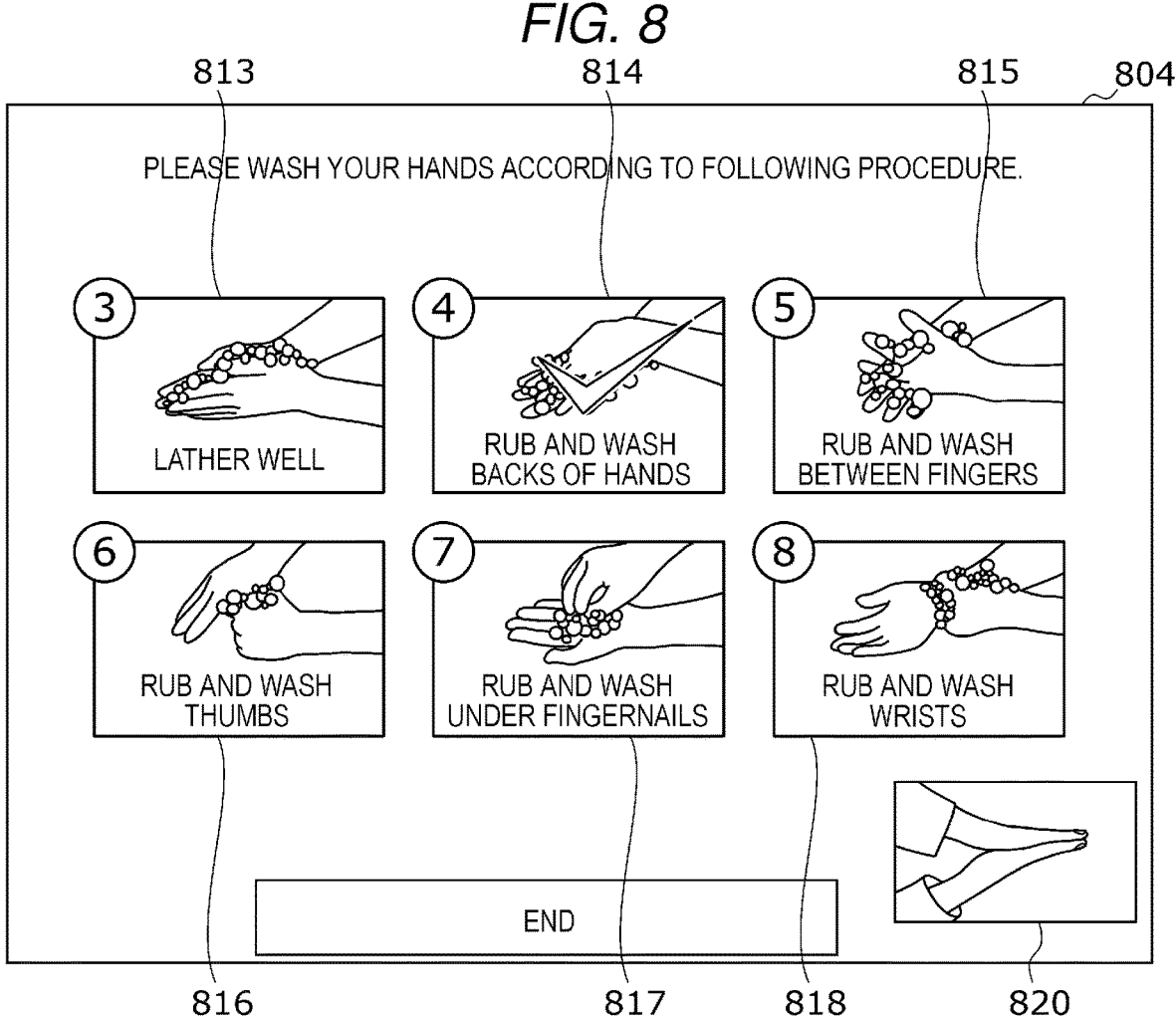
FIG. 8 depicts another second procedure screen according to an embodiment.

FIG. 8 depicts another second procedure screen 804. The second procedure screen 804 displays the updated second procedure screen 803. The processor 101 changes the appearance of the areas of the screen corresponding to the procedure for which the corresponding flag is set. For example, the processor 101 changes the appearances by changing the color, size, or transparency of some or all of the areas 813-820. Alternatively, the processor 101 may change the appearance by not displaying some or all of the areas 813-820 in the second procedure screen 804. In another instance, the processor 101 may change the appearance by displaying a predetermined image on or around the areas 813-820. For example, the area 814 in the second procedure screen 804, displays a checkmark overlayed on the image displayed in the same area of the second procedure screen 803.

In ACT 31, the processor 101 determines whether the subject has completed all of the procedures (3) to (8). For example, in a case where all of the flags corresponding to the respective procedures (3) to (8) have been set, the processor 101 determines that the subject has completed all of the procedures (3) to (8) (Yes in ACT 31) and proceeds to ACT32. If the processor 101 determines that the subject has not completed all of the procedures (3) to (8) (No in ACT 31), the processor 101 returns to ACT 24.

In ACT 32, the processor 101 generates an image corresponding to a third procedure screen 805 (see FIG. 9) indicating the procedure belonging to a third block in the hand-washing action. The procedure belonging to the third block is, for example, the procedure (9). Then, the processor 101 instructs the display device 400 to display the generated image. Upon receiving the display instruction, the display device 400 displays the third procedure screen 805.

Figure 9:
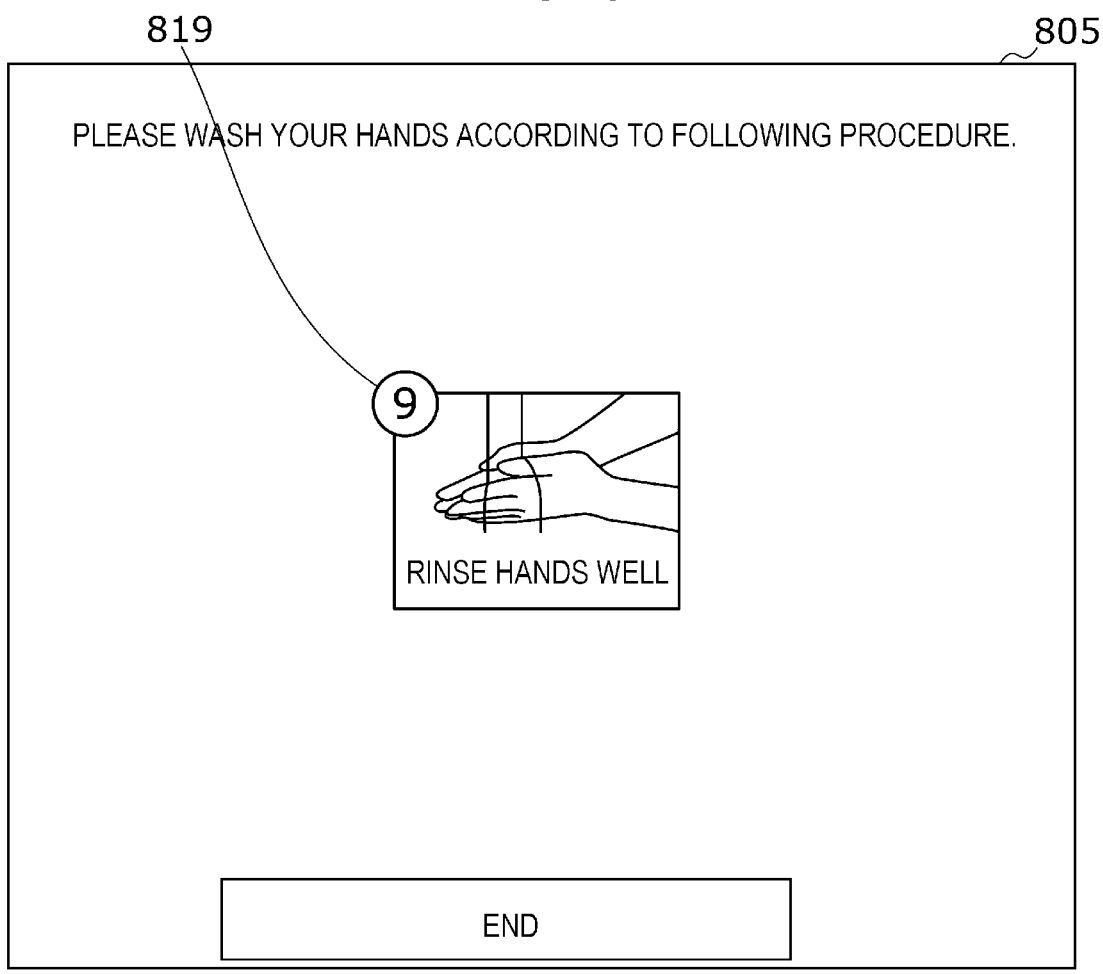
FIG. 9 depicts a third procedure screen according to an embodiment.

FIG. 9 depicts an example of the third procedure screen 805. The third procedure screen 805 includes the area 819. The area 819 corresponds to the procedure (9).

In ACT 33, the processor 101 waits for the subject to perform the procedure (9). If the processor 101 determines that the subject has executed the procedure (9) (Yes in ACT 33), the processor 101 proceeds to ACT 34. The processor 101 determines that the subject has executed the procedure (9), for example, in a similar manner to the processing in ACT 25. Alternatively, the processor 101 may determine that the subject has executed the procedure (9) when a certain period of time elapses from the start or execution of the processing of ACT 32.

Figure 10:
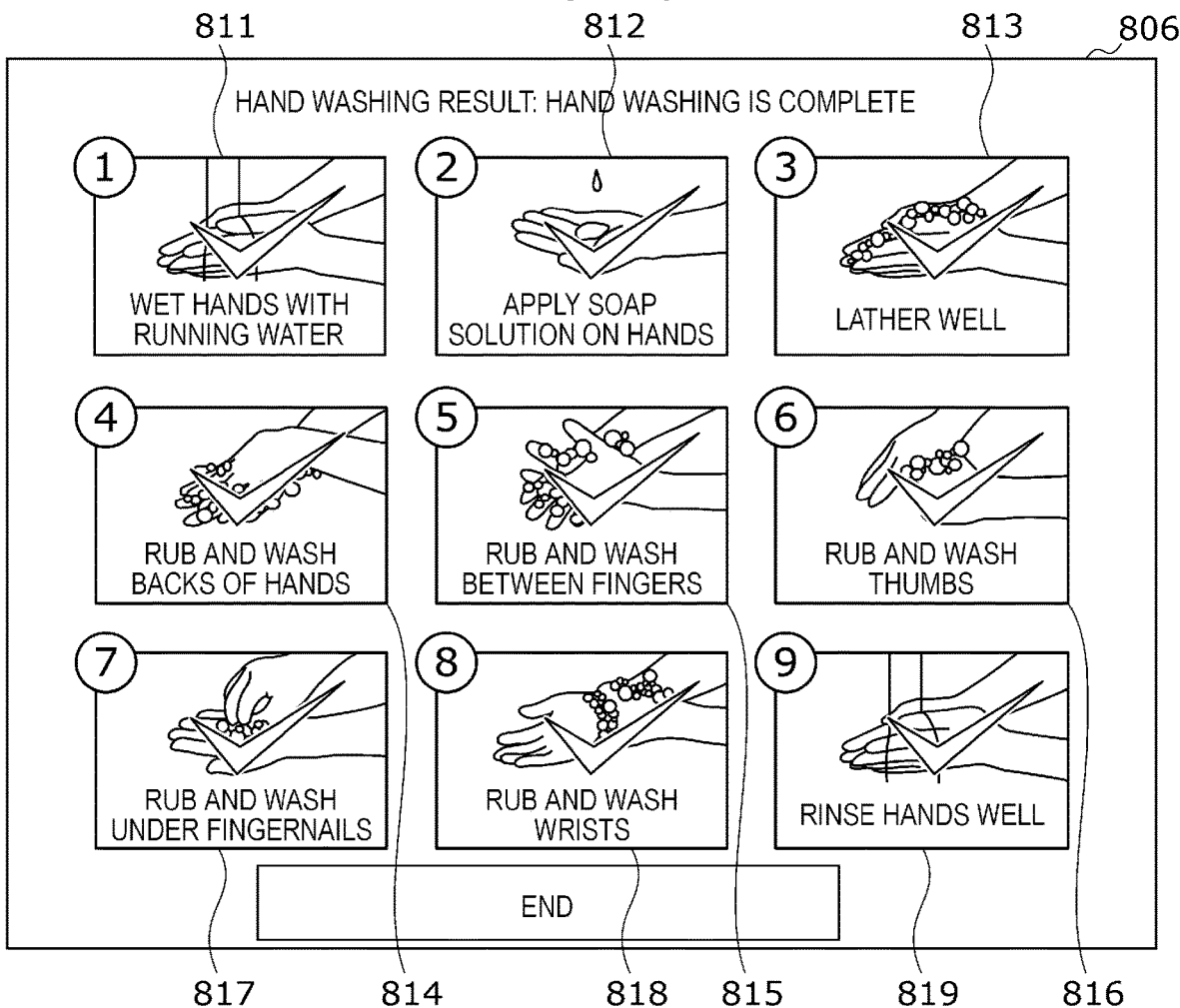
FIG. 10 depicts a result screen according to an embodiment.

In ACT 34, the processor 101 generates an image corresponding to a result screen 806 (see FIG. 10). Then, the processor 101 instructs the display device 400 to display the generated image. Upon receiving the display instruction, the display device 400 displays the result screen 806.

FIG. 10 depicts an example of the result screen 806. The result screen 806 indicates that the subject has completed all of the procedures (1) to (9). In a similar manner to the overall procedure screen 801 (see FIG. 5), the result screen 806 includes the areas 811 to 819. As shown in FIG. 10, the result screen 806 indicates that all procedures corresponding to the areas 811 to 819 are complete by making the appearance thereof different from that of the overall procedure screen 801. For example, each of the areas 811 to 819 in the result screen 806 displays a checkmark overlayed on the image displayed in the same area of the overall procedure screen 801. Each checkmark indicates the completion of the corresponding procedure.

In ACT 35, the processor 101 stores the result that the subject has completed the hand-washing action. For example, the processor 101 stores in the auxiliary storage device 104 or the like the current time, information indicating that each of the procedures (1) to (9) is complete, the individual execution times of each of the procedures (3) to (8), and information indicating that hand-washing has been completed in association with the personal ID of the subject obtained in ACT 15 of FIG. 3. Alternatively, the processor 101 may store the result in a server, a cloud-based storage system, or the like.

Accordingly, the processor 101 performs the processing of ACT 35 to function as a storing unit that stores the data or information indicating the completion of the procedures in association with the personal ID of the subject.

In ACT 36 of FIG. 4, the processor 101 controls the passage control device 600 to unlock a passage, such as a gate and a door that leads to a neighboring room or the like, so that the subject who has completed all of the predetermined procedures of the hand-washing action can pass through the passage. The passage control device 600 controls the passage such that the subject cannot pass through the gate, the door, or the like until the processor 101 performs the processing of ACT 36.

In ACT 37, the processor 101 resets the flags of all completed procedures. The processor 101 also resets the execution time of each of the completed procedures to 0 seconds. Furthermore, the processor 101 controls the lighting device 700 to turn off the light or to reduce the brightness of the light. After the processing of ACT 37, the processor 101 returns to ACT 11 of FIG. 3.

Referring back to ACT 25 in FIG. 4, if the processor 11 determines that the subject has executed the procedure (9) (Yes in ACT 25), the processor 101 proceeds to ACT 38.

If the processor 11 determines that the subject has not executed the procedure (9) (No in ACT 25) and that the timeout has occurred (Yes in ACT 26), the processor 101 proceeds to ACT 38.

In ACT 38, the processor 101 generates an image corresponding to a result screen 807 (see FIG. 11). Then, the processor 101 instructs the display device 400 to display the generated image. Upon receiving the display instruction, the display device 400 displays the result screen 807. After the processing of ACT 38, the processor 101 returns to ACT 11 of FIG. 3.

FIG. 11 depicts an example of the result screen 807. The result screen 807 indicates that the subject has performed the procedure (9) without completing at least one of the procedures (3) to (8), or that the subject did not complete the procedures (3) to (8) within a predetermined time period. The result screen 807 prompts the subject to wash his or her hands again. The result screen 807 includes the areas 811 to 819 in a similar manner to the overall procedure screen 801 (FIG. 5) and the result screen 806 (FIG. 10). As shown in FIG. 11, the result screen 807 indicates that some of the procedures are incomplete by making the appearance of corresponding ones of the areas 811 to 819 different from the overall procedure screen 801 and the result screen 806. In the result screen 807, the appearances of the areas 814 and 815 are different from those of the overall procedure screen 801 and the result screen 806 such that NG marks indicating the incompletion of the corresponding procedures are overlayed on the image displayed in the same areas of the overall procedure screen 801 or the result screen 806. The areas 811, 812, 813, 816, 817, 818, and 819 corresponding to the completed procedures have the same appearance as the result screen 806. The processor 101 determines whether each procedure is complete by referring to the corresponding flag.

Accordingly, the processor 101 executes the processing of ACT 38 to notify the subject that there is a procedure that has not been completed.

In the present embodiment, the processor 101 performs the processing of ACT 34 to ACT 37 in the case where the subject completes all of the predetermined procedures (3) to (8) whereas the processor 101 performs the processing of ACT 38 in the case where the subject does not complete at least one of the procedures (3) to (8). The processor 101, hence, functions as an execution unit that executes different processes depending on completion or incompletion of the procedures (3) to (8).

If the processor 101 determines by the first timeout processing (ACT 14 in FIG. 3) that the timeout has occurred, the processor 101 stores the result indicating that the subject did not complete the predetermined hand-washing action. For example, the processor 101 stores the current time, information indicating completion or incompletion of each of the procedures (1) to (9), the execution time of each of the procedures (3) to (8), and information indicating the incompletion of the predetermined hand-washing action in the auxiliary storage device 104 or the like in association with the personal ID of the subject obtained in ACT 15 of FIG. 3. Alternatively, the processor 101 may store the result in a server, a cloud-based storage system, or the like.

According to the present embodiment, the processor 101 executes different types of processing depending on completion or incompletion (or execution or nonexecution in a required manner) of the procedures (3) to (8) by the subject. For example, in a case where there is one or more incomplete procedures, the processor 101 displays the result screen 807 with error signs such as the NG marks as shown in FIG. 11 on the display device 400 (ACT 38 in FIG. 4). The subject can then notice that he or she did not complete at least one of the procedures (3) to (8) as required and know which procedures are incomplete by looking at the result screen 807.

According to the hygiene management system 1 of the present embodiment, the processor 101 can provide a notification of the fact that there is still an uncompleted procedure by displaying the result screen 807. Thus, the subject can know that there remains an uncompleted procedure. After the error display (ACT 38), the processor 101 returns to ACT 16 in FIG. 3. Accordingly, the control device 100 can prompt the subject to wash his or her hands again until all predetermined procedures are completed.

While in the present embodiment, the processor 101 of the control device 100 performs the determination of completion of the predetermined procedures (3) to (8) in that order, the processor 101 may determine completion of each procedure regardless of the order in which the subject performs the procedures (3) to (8) in another embodiment. This allows the subject to perform the procedures (3) to (8) in any order.

According to the present embodiment, based on the stored results of the hand-washing action of the subject in the auxiliary storage device 104 or the like in association with the subject's personal ID, a user, an operator, or the like of the control device 100 (the hygiene management device) or the hygiene management system 1 can check history information about the hand-washing actions executed in the past for the respective subjects.

According to the present embodiment, by controlling the passage control device 600 to make a passage (for example, a gate, a door, or the like) passable or impassable for the subject depending on completion or incompletion of all of the procedures (1) to (9) by the subject, the processor 101 of the control device 100 can prevent the subject who did not complete the hand-washing action as required from entering the hygiene control area, the clean area or the like.

While in the present embodiment, the control device 100 displays each screen on the display device 400 to notify the subject, the control device 100 may also or instead notify the subject by other methods. For example, the control device 100 may notify the subject using voice output from a speaker or lighting on and off a light source such as a light-emitting diode (LED).

While in the present embodiment, a part of the processing performed by the processor 101 of the control device 100 may be performed by a processor or the like included in the imaging device 200, a processor of the imaging device 200 may perform image processing such as image recognition and action recognition in other embodiments. For example, the processor of the imaging device 200 may perform determination processing of completion or incompletion of the predetermined procedures by the subject. The imaging device 200 send results of the determination to the control device 100 via the communication interface 105. The control device 100 then performs other processing based on the received results.

The processor 101 of the control device 100 may realize a part or all of the processing by a hardware configuration of a circuit instead of or in addition to the stored programs.

The control device 100 may be provided to an administrator, a user, or the like (may also be collectively referred to an administrator herein) thereof in a state in which the program (or programs) for the processing execution have been stored therein. Alternatively, the control device 100 may be provided to an administrator thereof in a state where the program (or programs) has not been stored. In the alternative case, the program is separately installed and stored in the control device 100 by the administrator or a service person. The provision of the program can be realized by using a removable storage medium such as a disk medium or a semiconductor memory or by downloading via the Internet or LAN.

While certain embodiments have been described, these embodiments have been presented by way of example only and are not intended to limit the scope of the inventions. Indeed, the novel methods and systems described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A hygiene management device, comprising: a processor configured to: cause a display screen to display a plurality of boxes each respectively corresponding to one of a plurality of predetermined procedures of a hand-washing action; recognize, based on image recognition on captured images of the hand-washing action performed by a subject, whether of the plurality of predetermined procedures of the hand-washing action have been completed by the subject; cause the display screen to display a captured image of the hand-washing action performed by the subject; cause the display screen to indicate when a corresponding one of the plurality of predetermined procedures has been recognized as having been completed by the subject; and cause the display screen to display different information to the subject depending on completion or incompletion of each of the plurality of predetermined procedures, wherein each of the plurality of boxes shows at least one of an image and a description of each of the predetermined procedures on the display screen, wherein the processor is further configured to place an error sign on any one of the plurality of boxes corresponding to an incomplete procedure.

2. The hygiene management device according to claim 1, wherein the processor is further configured to notify the subject of an incomplete procedure among the predetermined procedures.

3. The hygiene management device according to claim 1, wherein the processor is further configured to: obtain identification information for the subject; and store a date related to the predetermined procedures performed by the subject in association with the identification information.

4. The hygiene management device according to claim 1, wherein the processor is further configured to keep a passage impassable until the subject completes all of the predetermined procedures.

5. The hygiene management device according to claim 4, wherein the processor is further configured to make the passage passable when the processor determines that all of the predetermined procedures have been completed.

6. The hygiene management device according to claim 1, wherein the processor is further configured to: measure a time period of each of the predetermined procedures performed by the subject; and determine whether each of the predetermined procedures has been completed within a predetermined time period.

7. The hygiene management device according to claim 1, wherein the processor causes the display screen to display a screen with a subset of the plurality of boxes if one of the predetermined procedures corresponding to the subset is not recognized as being completed.

8. A hygiene management device, comprising: a display screen to display information to a subject; an imaging device to capture images of the subject performing a hand-washing action; a passage control device configured to control an opening of a gate or door of a passage; and a processor configured to: cause a display screen to display a plurality of boxes each respectively corresponding to a plurality of predetermined procedures for the hand-washing action; recognize each of the plurality of predetermined procedures of the hand-washing action being performed by subject from a captured image from the imaging device; cause the display screen to display the captured image from the imaging device when the handwashing action is being performed by the subject; determine based on a result of the recognition whether each of the predetermined procedures is complete or incomplete; after each one of the predetermined procedures is determined to be complete, cause the display screen to indicate the corresponding one of the plurality of predetermined procedures has been completed; after one of the predetermined procedures is determined to be incomplete, cause the display screen to notify the subject of an incomplete procedure among the predetermined procedure; and control the passage control device to make the passage passable for the subject after all of the predetermined procedures are determined to be completed, wherein each of the plurality of boxes shows at least one of an image and a description of each of the predetermined procedures on the display screen; and the processor is further configured to place an error sign on any one of the plurality of boxes corresponding to the incomplete procedure.

9. The hygiene management device according to claim 8, wherein the processor is further configured to: store a date related to the predetermined procedures performed by the subject in association with identification information of the subject.

10. The hygiene management device according to claim 8, wherein the processor is further configured to determine whether each of the predetermined procedures has been completed within a predetermined time period.

11. The hygiene management device according to claim 8, wherein the processor causes the display screen to display a screen with a subset of the plurality of boxes if one of the predetermined procedures corresponding to the subset is determined as incomplete.

12. A hygiene management method, comprising: causing a display screen to display a plurality of boxes each respectively corresponding to one of a plurality of predetermined procedures of a hand-washing action; recognizing, based on image recognition on captured images of the hand-washing action performed by a subject, whether each of the plurality of predetermined procedures of the hand-washing action have been completed by the subject; causing the display screen to display a captured image of the hand-washing action performed by the subject; causing the display screen to indicate when a corresponding one of the plurality of predetermined procedures has been recognized as having been completed by the subject; and causing the display screen to display different information to the subject depending on completion or incompletion of each of the plurality of predetermined procedures, each of the plurality of boxes shows at least one of an image and a description of each of the predetermined procedures on a display, and an error sign is placed on any one of the plurality of boxes corresponding to an incomplete procedure.

13. The hygiene management method according to claim 12, further comprising: notifying the subject of an incomplete procedure among the predetermined procedures.

14. The hygiene management method according to claim 12, further comprising: obtaining identification information of the subject; and storing a date related to the predetermined procedures performed by the subject in association with the identification information.

15. The hygiene management method according to claim 12, further comprising: keeping a passage impassable until the subject completes all of the predetermined procedures; and making the passage passable when all of the predetermined procedures have been completed.

16. The hygiene management method according to claim 12, further comprising: measuring a time period of each of the predetermined procedures performed by the subject; and determining whether each of the predetermined procedures has been completed within a predetermined time period.

* * * * *